United States Patent [19]

Osawa et al.

[11] Patent Number: 4,942,491
[45] Date of Patent: Jul. 17, 1990

[54] MAGNETIC HEAD SUPPORTING DEVICE

[75] Inventors: Tsuyoshi Osawa, Tanashi; Yasuo Yagami, Tokyo, both of Japan

[73] Assignee: Teac Corporation, Tokyo, Japan

[21] Appl. No.: 238,828

[22] Filed: Aug. 31, 1988

[30] Foreign Application Priority Data

Sep. 7, 1987 [JP] Japan .................. 62-136535

[51] Int. Cl.$^5$ .............................................. G11B 5/48
[52] U.S. Cl. .................................................. 360/104
[58] Field of Search ............. 380/104, 105, 106, 98.01

[56] References Cited

U.S. PATENT DOCUMENTS

| 4,107,748 | 8/1978 | Ho ......................................... 360/104 |
| 4,739,430 | 4/1988 | Manzke et al. ....................... 360/104 |
| 4,829,395 | 5/1989 | Coon et al. ........................... 360/104 |
| 4,835,641 | 5/1989 | Maeda ................................. 360/104 |

*Primary Examiner*—David J. Severin

*Attorney, Agent, or Firm*—Woodcock, Washburn, Kurtz, Mackiewicz & Norris

[57] ABSTRACT

For supporting magnetic heads for data transfer with a stacked array of rigid magnetic disks, a unitary support structure is provided which is formed to include a row of ledges spaced from each other in a direction parallel to the axis of disk rotation. The ledges have defined therein one or more rows of mounting holes which are aligned in a direction parallel to the axis of disk rotation. Mounted to each ledge is a head/arm assembly including a load arm carrying a magnetic head on a distal end thereof. Proximally, each load arm is fastened to the ledge by one or more fastener elements such as screws matingly engaged in the mounting holes. A required number of head/arm assemblies can be successively mounted to the ledges of the support structure with use of a screwdriver or like tool inserted in and through the aligned mounting holes in the other ledges.

2 Claims, 3 Drawing Sheets

MAGNETIC HEAD SUPPORTING DEVICE

BACKGROUND OF THE INVENTION

Our invention relates generally to data storage systems employing magnetic disks for reading and/or writing data thereon, and more specifically to an apparatus comprising a stacked array of rigid magnetic disks in combination with transducers or heads for data transfer with one or both sides of each disk. Still more specifically, our invention pertains to a device for supporting the heads in such data transfer systems, and to a method of assembling the head supporting device.

U.S. Pat. No. 4,107,748 to Ho suggests a typical conventional head supporting device for use in a random access data storage system having a stack of spaced magnetic disks. Essentially, it teaches the mounting of individual head on spring arms which in turn are mounted to inflexible extension arms. These extension arms are separated by spacers and interconnected by mounting bolts between a pair of brackets.

We object to the above and other comparable prior art head support assemblies because, first of all, the spring arms carryig the magnetic heads are supported by separate parts which are rigidly interconnected. In the case of the Ho patent, the spring arms are affixed to the separate rigid extension arms which are bolted together via the intervening spacers. The assemblage of such conventional devices has therefore been troublesome and time consuming. Further, being supported by the separate means, the heads have been susceptible to different degrees of thermal offtracking. This weakness has so far been overcome only by applying thermal stresses to the head support assembly for a certain length of time.

SUMMARY OF THE INVENTION

We have hereby invented how to construct a head supporting device so as to enable easy assemblage and, at the same time, to minimize variations in the thermal offtracking of the individual heads supported.

Briefly, our invention provides, in a data transfer apparatus having a stacked array of magnetic disks rotatable about a common axis, a head supporting device which can be easily and accurately assembled by a simple tool such as a screwdriver. The head supporting device comprises a unitary support structure having a row of ledges projecting therefrom, the ledges being spaced from each other in a direction parallel to the axis of rotation of the magnetic disks. A plurality of mounting holes are formed one in each ledge and are all aligned in a direction parallel to the axis of rotation of the magnetic disks. The head supporting device further comprises a plurality of head/arm assemblies each including an arm havig a proximal end fastened to one ledge on the support structure by a fastener element received in one mounting hole in the ledge. Each arm carries on a distal end thereof a magnetic head for data transfer with a storage surface of one of the stacked magnetic disks.

Preferably, the aligned mounting holes in the ledges of the unitary support structure are tapped for mating engagement with machine screws employed as the fastener elements for mounting the head/arm assemblies to the ledges. The tapped holes serve not only for receiving the screws but also for the insertion of a screwdriver for turning the screws. Therefore, although the ledges are inseparable, the head/arm assemblies can be readily screwed thereto by passing a screwdriver through the mounting holes in the other ledges.

Another pronounced advantage of our invention is the ease of assemblage of the complete head supporting device. By virtue of the unitary construction of the support structure inclusive of the ledges, the constituent parts of the complete device are much less in number than those of the above reference prior art device. Of course, the smaller the number of the constituent parts, the easier is the assemblage thereof and, generally, the less is the manufacturing cost.

It will also be appreciated that, being supported by the unitary support structure formed in one piece with the ledges, the magnetic heads will be accurately positioned on the magnetic disks with substantially less variations in thermal displacement than heretofore. Experiment has proved that unlike the prior art, the head supporting device of our invention demands no application of thermal stress preparatory to use.

The above and other features and advantages of our invention and the manner of realizing them will become more apparent, and the invention itself will best be understood, from the following description and appended claims, with reference had to the attached drawings showing a preferred embodiment of our invention.

DESCRIPTION OF THE PREFERRED EMBODIMENT

Figure 1:
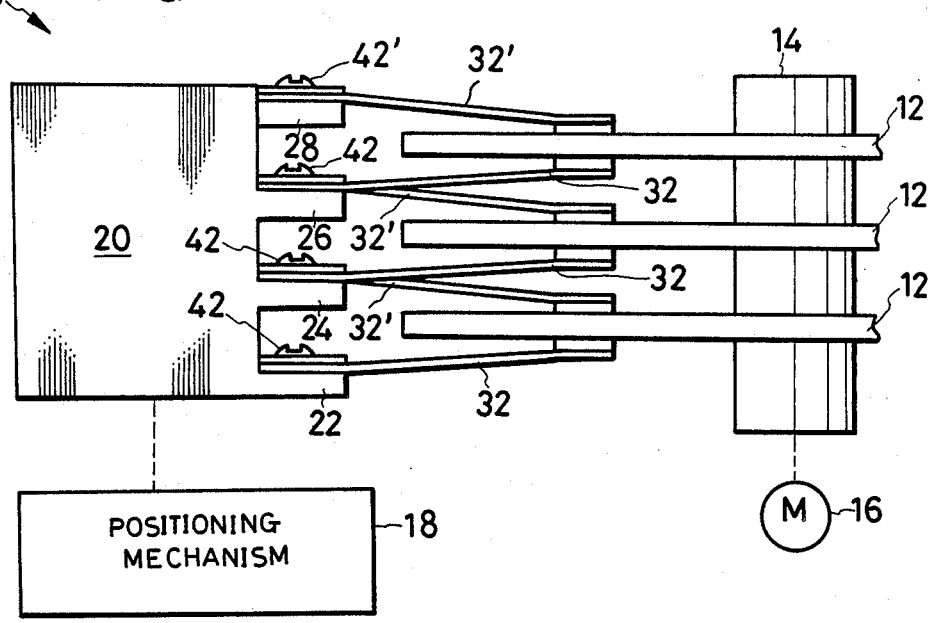
FIG. 1 is an elevation of the head supporting device constructed in accordance with our invention, the device being shown together with a stack of rigid magnetic disks for data transfer with the heads, the magnetic disks being shown fragmentarily for illustrative convenience.

We will now describe the head supporting device of our invention in detail in an environment of a data transfer system employing a stacked array of rigid magnetic disks. In FIG. 1 we have illustrated the representative head supporting device 10 as adapted for use with a stack of three double sided rigid magnetic disks 12 by way of example. In practice, of course, a greater number of disks may be stacked, and each disk may be single sided. The construction of the head supporting device 10 may then be modified accordingly, in a manner that will become apparent as the description proceeds. The exemplified three rigid magnetic disks 12 are supported by a hub assembly 14 conventionally coupled to an electric disk drive motor 16. Thus the magnetic disks 12 are jointly driven for rotation about a common axis. We assume that this common axis is vertical in order to facilitate the subsequent description of the head supporting device 10.

It will also be noted from FIG. 1 that the complete head supporting device 10 is coupled to a head positioning mechanism 18 of any known or suitable design via a carriage, not shown, on which the head supporting device is mounted. The head positioning mechanism 18 functions to move the head supporting device 10 across the data storage surfaces of the magnetic disks 12.

Figure 2:
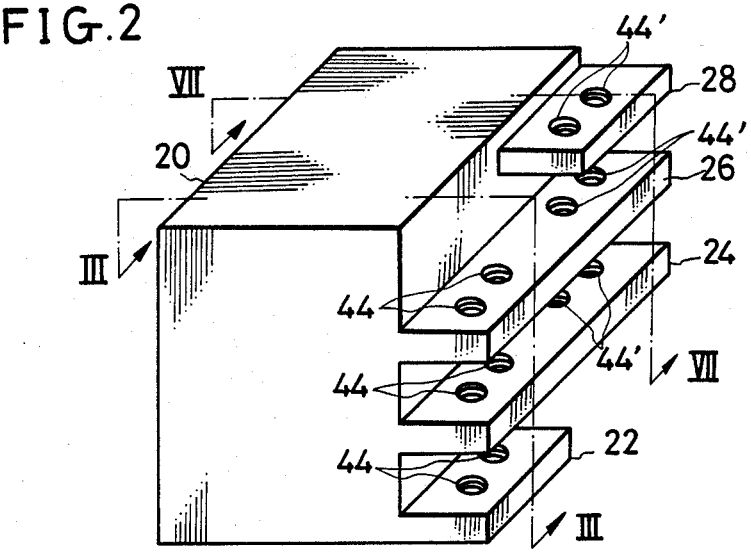
FIG. 2 is a perspective view of the unitary support structure, complete with the ledges, included in the head supporting device of FIG. 1.
Figure 3:
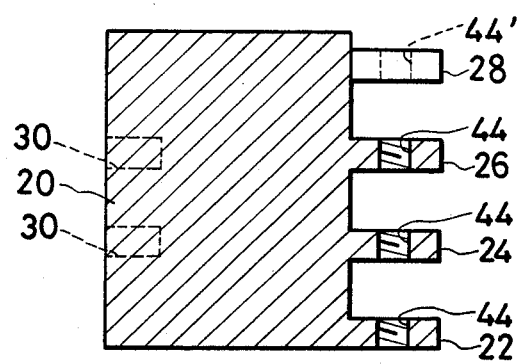
FIG. 3 is a section through the support structure, taken along the III—III in FIG. 2.

The head supporting device 10 includes a unitary support structure 20, shown also in FIGS. 2 and 3, having a plurality of horizontal ledges 22, 24, 26 and 28 formed in one piece therewith. These ledges project in parallel spaced relationship to one another from that side of the support structure 20 which confront the stack of rigid magnetic disks 12. Four such ledges are provided to conform to the three stacked disks 12 in this particular embodiment. We recommend that the support structure 20 with the ledges 22–28 be integrally die cast from aluminum or like metal. Seen at 30 in FIG. 3 are tapped holes for use in fastening the support structure 20 to the unshown carriage coupled to the head positioning mechanism 18.

Mounted to the ledges 22–28 of the support structure 20 are, in this particular embodiment, a vertical row of three head/arm assemblies 32 and another vertical row of three head/arm assemblies 32'. Both groups of head/arm assemblies 32 and 32' are essentially alike in construction.

Figure 4:
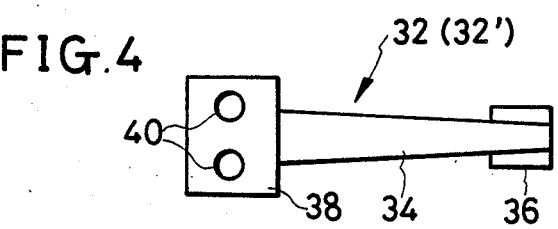
FIG. 4 is a plan view of one of the head/arm assemblies mounted to the support structure of FIGS. 2 and 3 to make up the head supporting device.

As illustrated in detail in FIG. 4, each head/arm assembly 32 includes a load arm 34 which in fact is a tapered cantilever spring. The load arm 34 carries a magnetic head 36 on its distal end of reduced width in a gimbal fashion. Attached to the proximal end of the load arm 34 by way of reinforcement is a rectangular piece of backup plate 38 having a pair of clearance holes 40 formed through the load arm and the backup plate.

As will be seen by referring back to FIG. 1, the three head/arm assemblies 32 are mounted to to the lower three ledges 22, 24 and 26, respectively, by fastener elements such as machine screws 42 extending through the clearance holes 40 in the reinforced proximal ends of the load arms 34. The machine screws 42 are engaged in three pairs of tapped mounting holes 44, FIGS. 2 and 3, formed in the ledges 22, 24 and 26. The three pairs of mounting holes 44 are vertically aligned in two rows in accordance with a feature of our invention.

So fastened to the ledges 22–26, the head/arm assemblies 32 have their load arms 34 angled upwardly to such an extent that the magnetic heads 36, mounted on the upper side of their distal ends, are preloaded against the lower storage surfaces of the magnetic disks 12. Normally, or when the magnetic disks 12 are out of rotation, the head 36 thus remain in forced contact with the magnetic disks 12. During the rotation of the magnetic disks 12 the resilient load arms 34 will permit the heads 36 to fly over the disk surfaces by virtue of an air bearing effect created therebetween. Such operation of the disk drive is widely known in the art as Winchester technology.

It will also be observed from FIG. 1 that the other group of three head/arm assemblies 32' are mounted to the upper three ledges 24, 26 and 28, respectively, of the support structure 20 by fastener elements such as machine screws 42'. These machine screws are matingly engaged in three pairs of tapped mounting holes 44', FIG. 2, formed in the ledges 24–28. The three pairs of mounting holes 44' are also vertically aligned in two rows. As seen in FIG. 2, the holes 44 are offset from the holes 44'.

The head/arm assemblies 32' are akin in construction to the head/arm assemblies 32 except that the magnetic heads of the head/arm assemblies 32' are mounted on the underside of the distal ends of the load arms. Further the load arms of the head/arm assemblies 32' are angled downwardly for preloading the heads against the upper storage surfaces of the magnetic disks 12. Therefore, these upper heads are also loaded into contact with the magnetic disks 12 when the latter are out of rotation, and fly over the disk surfaces during their rotation.

As will be noted from FIG. 2, the lowermost ledge 22 is shorter than the two intermediate ledges 24 and 26 and has only one pair of mounting holes 44 formed therein. This is because the lowermost ledge 22 is used for supporting only one head/arm assembly 32 for data transfer with the lower storage surface of the lowermost magnetic disk 12. The uppermost ledge 28 is also shorter than the two intermediate ledges 24 and 26 and has only one pair of mounting holes 44' formed therein. This uppermost ledge is intended for supporting only one head/arm assembly 32' for data transfer with the upper storage surface of the uppermost magnetic disk 12.

We will now proceed to the discussion of the method of assemblage of the head supporting device 10. This particular head supporting device can be assembled with use of only a screwdriver shown at 46 in FIG. 5, provided that the head/arm assemblies 32 and 32' are all ready for such assemblage.

Figure 5:
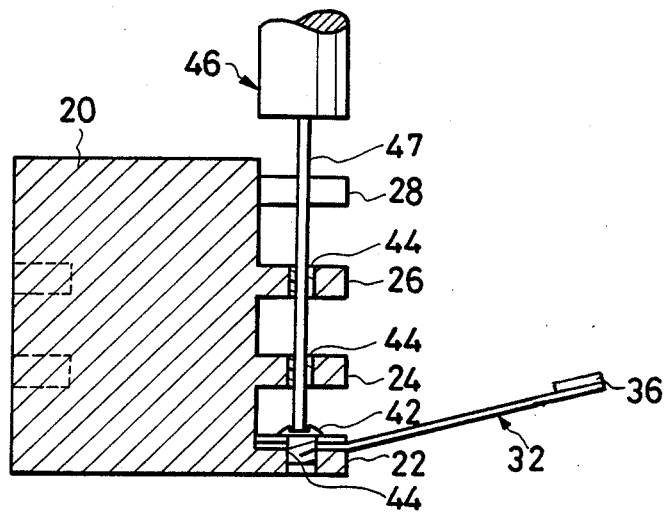
FIG. 5 is a view similar to FIG. 3 but explanatory of the way in which one of the head/arm assemblies is mounted to the support structure.

First, for mounting the three head/arm assemblies 32, for example, to the ledges 22–26, one of these assemblies may first be fastened to the lowermost ledge 22 as illustrated in FIG. 5. Toward this end of the reinforced end 38 of the load arm 34 of the first or lowermost head/arm assembly 32 may be placed over the lowermost ledge 22, and the screws 42 may be inserted in the pair of tapped holes 44 in the ledge through the clearance holes 40 in the reinforced arm end. The shank 47 of the screwdriver 46 may be succesively inserted in and through the two vertically aligned rows of mounting holes 44 in the two higher ledges 24 and 26 for turning the screws 42. It is essential that the three pairs of mounting holes 44 in the ledges 22–26 be in vertical alignment in order to permit such turning of the screws 42 by the screwdriver 46. The spacings between the ledges 22–28, which are predetemined in relation to the spacings between the stacked magnetic disks 12, are such that the screws 42 cannot possibly be turned by inserting the screwdriver 46 in the space between the ledges 22 and 24.

Another head/arm assembly 32 may then be likewise screwed to the intermediate ledge 26 by inserting the screw driver 46 in and through the pair of tapped holes 44 in the higher ledge 26. Finally, the topmost head/arm assembly 32 may be screwed to the ledge 26.

Figure 6:
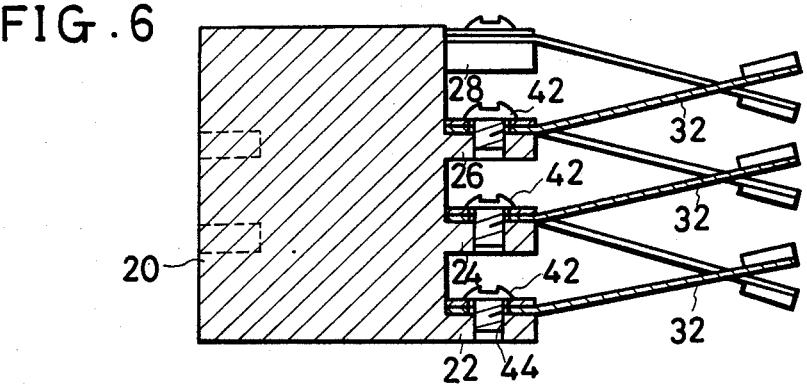
FIG. 6 is also a view similar to FIG. 3 but showing the support structure together with the head/arm assemblies mounted thereto.

We have illustrated in FIG. 6 the first group of three head/arm assemblies 32 screwed to the ledges 22–26 of the support structure 20. It will be seen that the load arms 34 of these head/arm assemblies 32 are angled upwardly to a greater extent than they are in the showing of FIG. 1. This difference comes, of course, from the fact that the magnetic heads on the load arms shown in FIG. 6 are not loaded against the magnetic disks 12.

Figure 7:
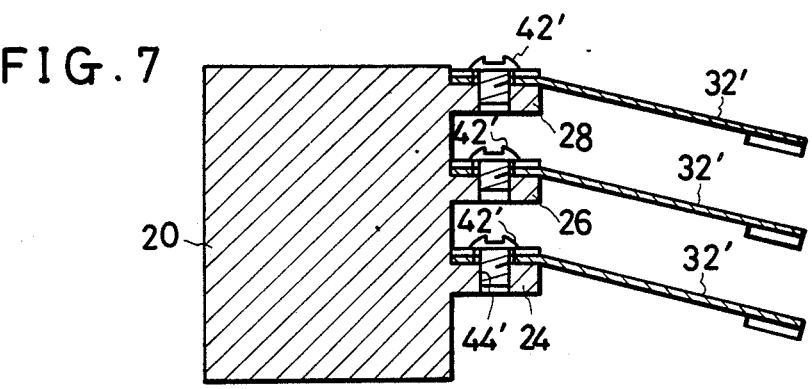
FIG. 7 is a section through the support structure, taken along the line VII—VII in FIG. 2 and shown together with the head/arm assemblies mounted thereto.

FIG. 7 shows the other group of three head/arm assemblies 32' that have been fastened to the respective ledges 24–28 by the screws 42'. We consider it self evident how these head/arm assemblies 32' are mounted to the ledges 24–28, from the foregoing discussion of how the first group of head/arm assemblies 32 are fastened to the ledges 22–26. In FIG. 7 are shown the laod arms of the head/arm assemblies 32' angled downwardly to greater extent than they are in FIG. 1. The magnetic heads of both first and second groups of head/arm assemblies 32 and 32' will be properly loaded against the opposite storage surfaces of the magnetic disks 12 as these disks are positioned respectively between the associated pairs head/arm assemblies 32 and 32' as in FIG. 1.

Despite the foregoing detailed disclosure we do not wish our invention to be limited by the exact details of the illustrated embodiment. A variety of modifications or alterations will suggest themeselves to those skilled in the art within the broad teaching hereof. For example, each head/arm assembly may be fastened with only one fastener element if the possible displacement of the so fastened head/arm assembly is suitably precluded. It will also be apparent that the two groups of head/arm assemblies may be mounted to separated support structures each having an integral set of ledges for supporting one group of head/arm assembly. Of course only one group of head/arm assemblies may be supported as taught by our invention if the stacked array of magnetic disks are single sided. We understand that the appended claims cover all these and other obvious changes of our invention.

What is claim is:

1. In a data transfer apparatus having a stacked array of double sided magnetic disks rotatable about a common axis, a head supporting device which can be easily and accurately assembled by a single tool such as a screwdriver, the head supporting device comprising:
   (a) a unitary support structure having a row of ledges projecting therefrom, the ledges being spaced from each other in a direction parallel to the axis of rotation of the magnetic disk;
   (b) there being first and second rows of mounting holes formed in the ledges, each row of mounting holes being offset from one another and being aligned in a direction parallel to the axis of rotation of the magnetic disks;
   (c) a plurality of fastener elements;
   (d) a first set of head/arm assemblies each including a first arm having a proximal end fastened to one ledge on the support structure by one fastener element received in one of the first row of mounting holes, each first arm carrying on a distal end thereof a first magnetic head for data transfer with a first side of one magnetic disk; and
   (e) a second set of head/arm assemblies each including a second arm having a proximal end fastened to one ledge on the support structure by one fastener element received in one of the second row of mounting holes, each second arm carrying on a distal end thereof a second magnetic head for data transfer with a second side of one magnetic disk;
   (f) whereby each of the first and second set of head/arm assemblies can be successively fastened to the ledges on the support structure with the fastener elements by inserting an associated tool into and through the aligned mounting holes in the other ledges.

2. In a data transfer apparatus having a stacked array of double sided rigid magnetic disks rotatable about a common axis a head supporting device which can be easily and accurately assembled by a simple tool such as a screwdriver, the head supporting device comprising:
   (a) a unitary support structure having a row of ledges projecting therefrom, the ledges being spaced from each other in a direction parallel to the axis of rotation of the magnetic disk;
   (b) there being first pairs of mounting holes formed in the ledges and aligned in two rows each extending in a direction parallel to the axis of rotation of the magnetic disks;
   (c) there also being second pairs of mounting holes formed in the ledges and aligned in two rows extending in a direction parallel to the axis of rotation of the magnetic disks, said first and second pairs of mounting holes being offset from each other;
   (d) a plurality of fastener elements;
   (e) a first set of head/arm assemblies each including a first load arm of resilient material having a proximal end fastened to one ledge on the support structure by two fastener elements received in one first pair of mounting holes, each first load arm carrying in a gimbal fashion on a dital end thereof a first magnetic head and preloading the first magnetic head into contact with a first side of one magnetic disk in the absence of rotation thereof; and
   (f) a second set of head/arm assemblies each including a second load arm of resilient material having a proximal end fastened to one ledge on the support structure by two fastener elements received in one second pair of mounting holes, each second load arm carrying in a gimbal fashion on a distal end thereof a second magnetic head and preloading the second magnetic head into contact with a second side of one magnetic disk in the absence of rotation thereof;
   (g) whereby each of the first and second set of head/arm assemblies can be successively fastened to the ledges on the support structure with the fastener elements by inserting an associated tool into and through the aligned mounting holes in the other ledges.

* * * * *